(12) United States Patent
Murray et al.

(10) Patent No.: US 11,072,359 B2
(45) Date of Patent: Jul. 27, 2021

(54) MOVABLE STEERING WHEEL ASSEMBLIES

(71) Applicant: Ford Global Technologies, LLC, Dearborn, MI (US)

(72) Inventors: Andrew John Murray, Colchester (GB); Philipp Kuepper, Grevenbroich (DE); Mark Mason, Loughton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 16/720,164

(22) Filed: Dec. 19, 2019

(65) Prior Publication Data

US 2020/0198684 A1 Jun. 25, 2020

(30) Foreign Application Priority Data

Dec. 19, 2018 (GB) ...................................... 1820692

(51) Int. Cl.
  *B62D 1/183* (2006.01)
  *B62D 1/06* (2006.01)
  *B62D 1/10* (2006.01)
  *B62D 1/184* (2006.01)
  (Continued)

(52) U.S. Cl.
  CPC ............... *B62D 1/183* (2013.01); *B62D 1/06* (2013.01); *B62D 1/10* (2013.01); *B62D 1/184* (2013.01); *B62D 1/187* (2013.01); *G01D 5/14* (2013.01)

(58) Field of Classification Search
  CPC . B62D 1/183; B62D 1/06; B62D 1/10; B62D 1/184; B62D 1/187; B62D 1/04; G01D 5/14; G01D 5/145; F02P 11/06
  See application file for complete search history.

(56) References Cited

U.S. PATENT DOCUMENTS 2,683,996 A * 7/1954 Rabe ........................ B62D 1/10
  74/556
2,813,436 A * 11/1957 Barenyi .................... B62D 1/04
  74/555

(Continued)

FOREIGN PATENT DOCUMENTS

DE  102018121128 A1  3/2019
GB       2457244 A    8/2009

(Continued)

*Primary Examiner* — Drew J Brown
(74) *Attorney, Agent, or Firm* — David Coppiellie; Price Heneveld LLP

(57) ABSTRACT

An assembly for a motor vehicle is provided. The assembly comprises a steering wheel assembly comprising a steering wheel hub for coupling to a steering column of the motor vehicle, such that rotation of the hub about a steering axis rotates the steering column, and a steering wheel rim assembly comprising a steering wheel rim extending around a first axis of the steering wheel assembly, wherein the steering wheel rim is movably coupled to the steering wheel hub, such that the steering wheel rim is selectively pivotable relative to the steering wheel hub about a second axis, the second axis having a component in a direction perpendicular to the first axis, and a controller configured to determine a pivot angle of the steering wheel rim and activate or deactivate an ignition system and/or a driver restraint system of the vehicle based on the pivot angle.

17 Claims, 9 Drawing Sheets

(51) Int. Cl.
   *B62D 1/187*   (2006.01)
   *G01D 5/14*    (2006.01)

(56) References Cited

U.S. PATENT DOCUMENTS

| | | | | |
|---|---|---|---|---|
| 2,889,714 | A * | 6/1959 | Romano | B62D 1/04 |
| | | | | 74/493 |
| 3,386,309 | A * | 6/1968 | Reed | B62D 1/184 |
| | | | | 74/493 |
| 4,752,085 | A * | 6/1988 | Yamamoto | B62D 1/181 |
| | | | | 280/775 |
| 4,995,637 | A * | 2/1991 | Muraishi | B60N 3/005 |
| | | | | 108/44 |
| 5,386,785 | A * | 2/1995 | Naor | B60N 3/005 |
| | | | | 108/44 |
| 8,079,312 | B2 * | 12/2011 | Long | B60N 3/005 |
| | | | | 108/44 |
| 10,562,558 | B1 * | 2/2020 | Spahn | B62D 1/04 |
| 10,800,441 | B2 * | 10/2020 | Board | B62D 1/14 |
| 2016/0362126 | A1 | 12/2016 | Lubischer et al. | |
| 2016/0375860 | A1 * | 12/2016 | Lubischer | B60R 21/203 |
| | | | | 74/493 |
| 2016/0375927 | A1 * | 12/2016 | Schulz | B60R 21/203 |
| | | | | 280/775 |
| 2017/0297606 | A1 * | 10/2017 | Kim | B62D 1/181 |
| 2018/0037248 | A1 * | 2/2018 | Schwarz | B60W 60/0051 |
| 2018/0273081 | A1 * | 9/2018 | Lubischer | B62D 1/19 |
| 2018/0334183 | A1 * | 11/2018 | Beauregard | B62D 1/06 |
| 2019/0084609 | A1 * | 3/2019 | Rogers | B62D 1/187 |
| 2019/0291772 | A1 * | 9/2019 | Kreutz | B62D 1/10 |
| 2019/0303729 | A1 * | 10/2019 | Gramenos | G06K 9/00832 |
| 2020/0023882 | A1 * | 1/2020 | Krstic | B62D 1/192 |

FOREIGN PATENT DOCUMENTS

| | | |
|---|---|---|
| GB | 2558653 A | 7/2018 |
| WO | 2018060443 A1 | 4/2018 |

* cited by examiner

MOVABLE STEERING WHEEL ASSEMBLIES

FIELD OF THE DISCLOSURE

The present invention generally relates to motor vehicle steering wheels, and more particularly relates to movable steering wheel assemblies.

BACKGROUND OF THE DISCLOSURE

Steering wheels are a primary driving control used while operating motor vehicles. During driving of the vehicle, it is generally desirable for the steering wheel to be positioned in an ergonomic position for the driver to grip and rotate about a steering axis in order to steer the vehicle.

When the vehicle is not being driven, the steering wheel being in the ergonomic position for driving may hinder ingress and egress from the vehicle. Furthermore, when the steering wheel is in the ergonomic position for driving, the steering wheel may restrict space for other activities the driver may wish to perform in the vehicle, such as eating or working, e.g., writing on a notepad or using a computer.

SUMMARY OF THE DISCLOSURE

According to a first aspect of the present disclosure, there is provided an assembly for a motor vehicle. The assembly includes a steering wheel assembly comprising a steering wheel hub for coupling to a steering column of the motor vehicle, such that rotation of the hub about a steering axis rotates the steering column, and a steering wheel rim assembly comprising a steering wheel rim extending around a first axis of the steering wheel assembly, wherein the steering wheel rim is movably coupled to the steering wheel hub, such that the steering wheel rim is selectively pivotable relative to the steering wheel hub about a second axis, the second axis having a component in a direction perpendicular to the first axis, and a controller configured to determine a pivot angle of the steering wheel rim and activate or deactivate an ignition system and/or a driver restraint system of the vehicle based on the pivot angle.

The steering wheel rim may extend partially or substantially completely around the first axis. For example, the steering wheel rim may extend through an angle of more than 180 degree around the first axis.

The steering wheel rim may be slidably coupled to the steering wheel hub. For example, one of the steering wheel hub and the steering wheel rim assembly may comprise one or more slots, and the other of the steering wheel hub and the steering wheel rim assembly may comprise one or more pins slidably received within respective ones of the one or more slots. Movement of the steering wheel rim relative to the steering wheel hub may be guided by the one or more pins moving within the one or more the slots. The slots and pins may be configured such that sliding of the one or more pins within the one or more slots results in a rotation of the steering wheel rim about the second axis and a translation of the steering wheel rim in a direction with a component in a vertical direction. The direction may further comprise a component in a horizontal direction.

The steering wheel assembly may further comprise a sensor configured to determine a pivot angle of the steering wheel rim about the second axis. For example, one of the pins comprises an electrical contract and the slot corresponding to the one of the pins comprises a corresponding electrical contact. The pivot angle of the steering wheel rim may be determined based on an electrical connection being made between the electrical contact and the corresponding electrical contact. In other words, the sensor may comprise the electrical contact and the corresponding electrical contact.

The steering wheel rim assembly may further comprise one or more rim support members, e.g., spokes. The steering wheel rim may be movably coupled to the steering wheel hub by the one or more rim support members. For example, the rim support members may be fixedly coupled to the steering wheel rim and may be movably coupled to the steering wheel hub. Alternatively, the rim support members may be fixedly coupled to the steering wheel hub and may be movably coupled to the steering wheel rim. The rim support members may be arranged such that the rim support members extend between the steering wheel hub and the steering wheel rim in a horizontal direction when the steering wheel hub is arranged at a straight ahead steering angle, e.g., around the steering axis.

The steering wheel rim may be pivotable between a steering position and a reclined position. In the steering position, the first axis may be aligned with the steering axis of the steering wheel hub. In the reclined position, the first axis may extend in a direction having a greater component in a vertical direction, e.g., compared to the steering position. The steering wheel rim may be pivoted such that an upper end of the steering wheel rim moves rearwards and downwards when the steering wheel rim is pivoted from the steering position to the reclined position. The steering wheel rim may be pivoted such that a lower end of the steering wheel rim moves forwards and upwards when the steering wheel rim is pivoted from the steering position to the reclined position.

In the present specification, the "front" of the steering wheel refers to the side of the steering wheel configured to face the occupants of the vehicle, e.g., in the steering position, and the "rear" of the steering wheel refers to the side of the steering wheel opposite the front, e.g., facing away from the occupants. The directions "forwards" and "rearwards" are defined relative to the steering wheel. For example, the forwards direction is the direction from the steering wheel front face towards the occupants of the vehicle.

The steering wheel rim may be biased into the reclined position. Alternatively, the steering wheel rim may be biased into the steering position.

The controller may be configured to deactivate the ignition system and/or the driver restraint system when the steering wheel rim is away from the steering position or in the reclined position. The controller may be configured to activate the ignition system and/or the driver restraint system when the steering wheel rim is in the steering position.

The assembly may comprise a lock configured to secure the position of the steering wheel rim relative to the steering wheel hub. The assembly may further comprise a release for selectively releasing the lock. The lock may be configured to secure the position of the steering wheel in one or more discrete positions. For example, the lock may be configured to secure the position of the steering wheel rim in the steering position. Additionally or alternatively, the lock may be configured to secure the position of the steering wheel rim in the reclined position. Additionally or alternatively again, the lock may be configured to secure the position of the steering wheel rim at a plurality of positions, between the steering position and the reclined position. In other arrangements, the lock may be configured to secure the steering wheel rim at substantially any position continuously between the steering position and the reclined position. The lock may comprise an electromechanical latch. The release may comprise a switch for controlling the operation of the electromechanical latch, e.g., to secure or release the steering wheel rim.

The assembly via the controller, may be configured such that the lock is not releasable when the vehicle is in an operating condition, such as in which a drive system of the vehicle is operating and/or the vehicle is in motion. For example, the controller may be configured to control the lock based on the operation of the release and the operating condition of the vehicle. For example, the controller, or another controller of the assembly, may be configured to receive an input from the release, and may control the operation of the lock based on the input from the release and whether the vehicle is in the operating condition. The controller may be configured to determine whether the vehicle is in an operating condition.

The assembly may further comprise a steering angle sensor configured to determine a rotation angle of the steering wheel hub about the steering axis. The assembly, via the controller, may be configured such that the lock is not releasable when the steering angle is more than a threshold angle from a straight ahead steering angle. For example, the controller, or another controller of the assembly, may be configured to receive an input from the release, and may control the operation of the lock based on the input from the release and the angle determined by the angle sensor.

The assembly may further comprise a workpiece retainer. The workpiece retainer may be configured to protrude from a front face of the steering wheel rim, such as a face of the steering wheel rim facing the driver, and abut a workpiece rested on the front face of the steering wheel rim and thereby retain the workpiece on the steering wheel rim. The workpiece retainer may prevent or restrict the workpiece from sliding forwards and/or downwards over the steering wheel rim. For example the workpiece retainer may comprise an abutment face extending substantially perpendicularly to the front face of the steering wheel rim. The workpiece may abut the abutment face to be retained on the steering wheel rim. The workpiece retainer may be movably coupled to the steering wheel rim assembly. The workpiece retainer may be movable between a retracted position and a protruding position in which the workpiece retainer protruded further forwards, from the front face of the steering wheel rim compared to in the retracted position.

The workpiece retainer may be configured to form the release for releasing the lock, e.g., for securing the position of the steering wheel rim relative to the hub. The steering wheel assembly may be configured such that the lock is engaged when the workpiece retainer is in the retracted positon and is disengaged when the workpiece retainer is in the protruding position or vice versa.

According to another aspect of the present disclosure, a steering wheel assembly for a motor vehicle is provided. The assembly includes a steering wheel hub for coupling to a steering column of the motor vehicle such that rotation of the steering wheel hub about a steering axis rotates the steering column, a steering wheel rim assembly comprising a steering wheel rim extending about a first axis of the steering wheel assembly, wherein the steering wheel rim is movably coupled to the steering wheel hub such that the steering wheel rim is selectively pivotable relative to the steering wheel hub about a second axis, the second axis having a component in a direction perpendicular to the first axis, and a sensor configured to determine a pivot angle of the steering wheel rim about the second axis.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. In particular, features of the disclosure described with reference to the first aspect of the disclosure may equally be applied to the other aspects of the disclosure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 8a and 8b are side views of a steering wheel assembly according to another arrangement of the present disclosure, in a steering position and in a reclined position, respectively;

DETAILED DESCRIPTION OF THE PREFERRED EMBODIMENTS

Figure 1:
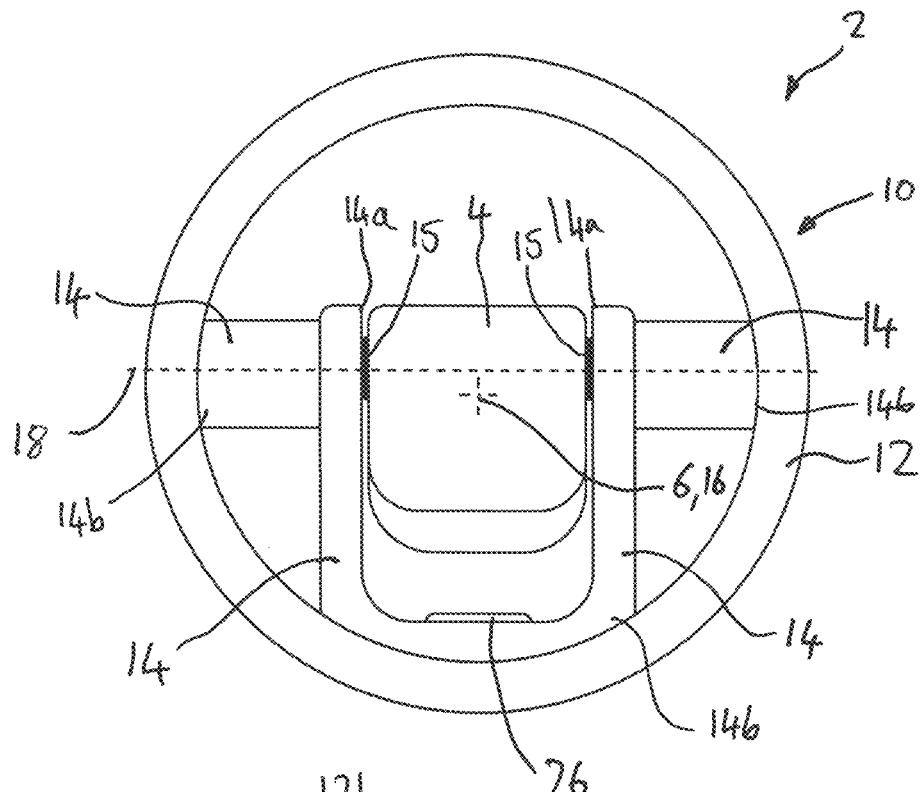
FIG. 1 is a front view of steering wheel assembly according to an arrangement of the present disclosure.
Figure 2A:
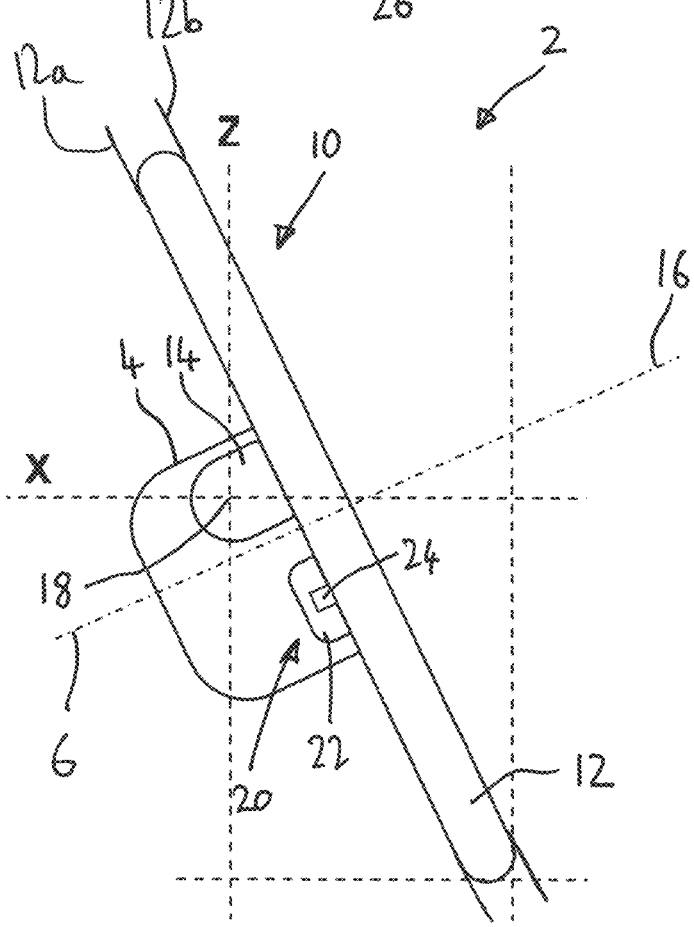
FIGS. 2a and 2b are side views of the steering wheel assembly shown in FIG. 1, in a steering position and in a reclined position, respectively.

With reference to FIGS. 1 and 2a, a steering wheel assembly 2 for a vehicle, such as a motor vehicle, comprises a hub 4 and a rim assembly 10. The hub 4 is configured to couple to a steering column (not shown) of the vehicle such that rotation of the hub 4 about a steering axis 6 rotates the steering column to steer the vehicle.

The rim assembly 10 comprises a steering wheel rim 12 and one or more rim support members, such as spokes 14. The steering wheel rim 12 is coupled to the hub 4 by the one or more spokes 14. The steering wheel rim 12 is to be gripped by a driver of the vehicle in order to rotate the steering wheel assembly 2 about the steering axis 6 to steer the vehicle. Accordingly, the steering wheel rim 12 may be shaped in order to provide an ergonomic grip for the driver.

As depicted, the steering wheel rim 12 may comprise a ring shaped member extending around a first axis 16. The steering wheel rim 12 extends axially along the first axis 16 between a rear face 12a and a front face 12b of the steering wheel rim 12.

In the arrangement shown, the steering wheel rim 12 is substantially toroidal in shape. However, in other arrangements, the steering wheel rim 12 may form any other shape around the first axis 16. For example, portions of the steering wheel rim 12 may form a square, rectangular, or any other polygonal shape around the first axis 16, e.g., in a plane perpendicular to the first axis 16. Additionally or alternatively, portions of the steering wheel rim 12 may form an oval or any other curved shape around the first axis 16.

Furthermore, although the steering wheel rim 12 is depicted having a circular shape in cross section, e.g., in a plane parallel with the first axis 16, in other arrangements, the cross section of the steering wheel rim may be any other shape. The cross-sectional shape of the steering wheel rim 12 may be substantially constant at different positions, e.g., different angular positions, around the first axis 16. Alternatively, the cross-sectional shape of the steering wheel rim 12 may vary around the first axis 16.

In the arrangement shown, the steering wheel rim 12 extends completely around the first axis 16. However, it is also contemplated that the steering wheel rim 12 may not extend completely around the first axis 16. For example, the steering wheel rim may comprise one or more straight and/or curved portions spaced apart, such as angularly spaced apart, around the first axis 16.

The steering wheel rim 12 is movably, e.g., pivotally, coupled to the hub 4, such that the steering wheel rim 12 can be pivoted relative to the hub 4 about a second axis 18. The steering wheel rim 12 may be moved, such as pivoted, between a steering position, depicted in FIGS. 1 and 2a and a reclined position, depicted in FIG. 2b. The steering wheel rim 12 may be biased into the reclined position of the steering position. For example, the steering wheel assembly 2 may comprises a resilient member for biasing the steering wheel rim into the reclined position. Alternatively, the steering wheel rim 12 may not be biased into either position.

Although the steering position and the reclined position are referred to as "positions" of the steering wheel rim, it will be appreciated that moving the steering wheel rim between the steering and reclined position may comprise rotating the steering wheel rim 12 about the second axis 18. Moving the steering wheel rim may further comprise translating the steering wheel rim. Alternatively, moving the steering wheel rim may consist of rotating the steering wheel rim. Accordingly, the term "positions" of the steering wheel rim may also refer to different orientations of the steering wheel rim 12.

Figure 2B:
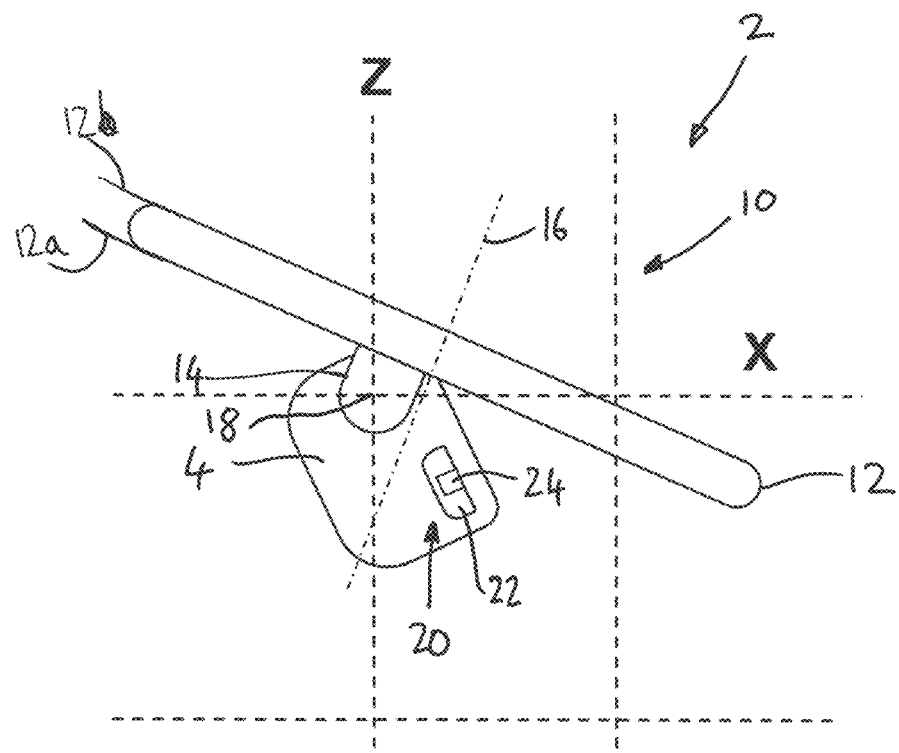

In the steering position, the first axis 16 of the steering wheel rim 12 may be aligned or substantially aligned, with the steering axis 6 of the hub 4. As shown in FIG. 2a, in the steering position, a component of the direction of the first axis 16 in a horizontal position may be greater than a component of the direction of the first axis 16 in a vertical direction. As shown in FIG. 2b, in the reclined position a vertical component of the direction of the first axis 16 of the steering wheel rim may be greater than in the steering position.

The steering wheel assembly 2 may be configured such that the reclined position of the steering wheel is offset, such as angularly offset, about the second axis 18 by a predetermined angle relative to the steering position. Alternatively, the steering wheel assembly 2 may be configured such that first axis 16 extends in a predetermined direction in the reclined position. For example, the steering wheel assembly 2 may be configured such that the first axis 16 extends in a substantially vertical direction in the reclined position.

As depicted in FIG. 2b, the steering wheel rim 12 may be moved into the reclined position by pivoting the steering wheel rim assembly 10 relative to the steering wheel hub 4 such that an upper portion of the steering wheel rim, e.g., a portion provided vertically above the second axis 18, moves rearwards in an X direction downwards in a Z direction. A lower portion of the steering wheel rim, e.g., a portion provided vertically below the second axis 18, may move forwards, in the X direction and upwards in the Z direction, when the steering wheel rim is moved into the reclined position.

In some arrangements, the steering column of the vehicle may be adjustable such that the steering axis 6 of the steering column and hub 4 can be selectively varied by the user. It will be appreciated that the steering position and the reclined position of the steering wheel rim may be changed when the position of the steering axis 6 is adjusted.

The spokes 14 may be pivotally coupled to the hub 4 at first ends 14a of the spokes. The spokes 14 may be coupled, such as fixedly coupled, to the steering wheel rim 12 at second ends 14b of the spokes 14. The spokes 14 may therefore move together with the steering wheel rim 12 as the rim moves relative to the hub 4.

Figure 3:
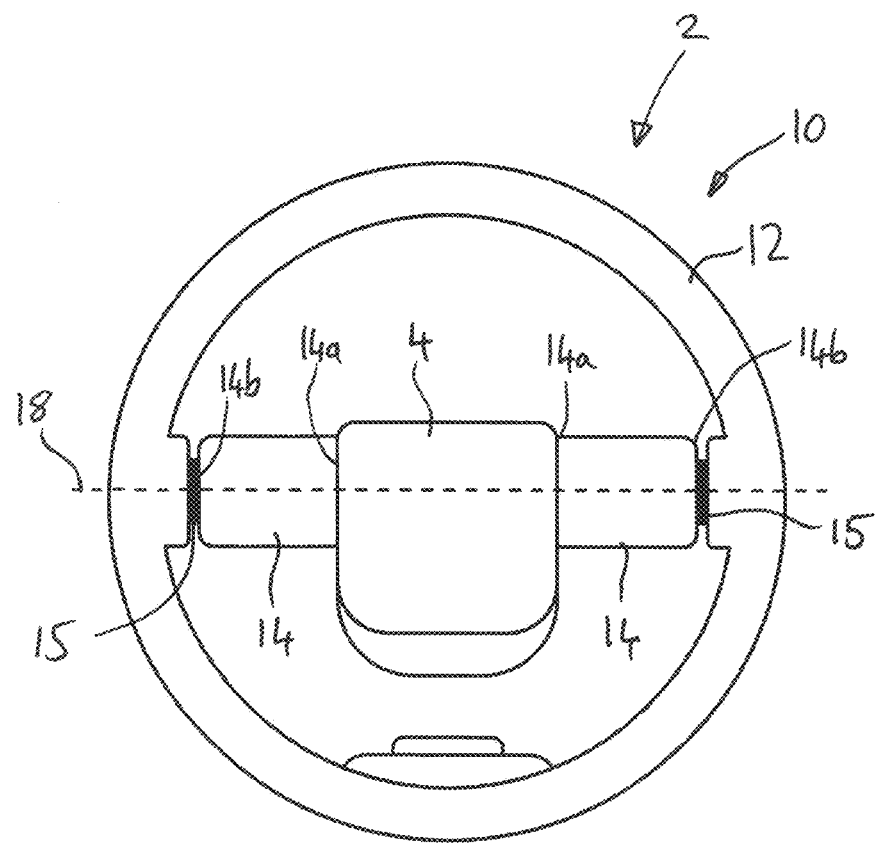
FIG. 3 is a front view of a steering wheel assembly according to another arrangement of the present disclosure.

In alternative arrangements, such as is depicted in FIG. 3, the spokes 14 may be fixedly coupled to the hub 4 at the first ends 14a of the spokes 14, and one or more of the spokes may be pivotally coupled to the steering wheel rim 12 at second ends of the spokes 14. The spokes 14 may therefore remain stationary relative to the hub 4 as the steering wheel rim 12 is moved relative to the hub 4.

The steering wheel assembly 2 may comprise one or more rotational couplings 15 for coupling the spokes 14 to the hub 4, as shown in FIGS. 1, 2a and 2b, or the spokes 14 to the rim 12, as shown in FIG. 3. The second axis 18 may be defined by the position and orientation of the rotational couplings 15. As depicted, two or more of the spokes 14 may be coupled to the hub 4 or rim 12 by a single one of the rotational couplings 15. In this case, the two or more spokes 14 may be coupled together at first ends 14a of the spokes 14.

The rotational couplings 15 may be arranged, such that the second axis 18 is in a horizontal direction when the steering wheel assembly 2 is in a straight ahead steering angle. In some arrangements, the steering wheel assembly 2 may be configured such that two or more of the spokes 14 extend in a horizontal direction between first and second ends of the spokes 14, when the steering wheel assembly 2 is in the straight ahead steering angle.

Pivoting the steering wheel rim 12 about the second axis 18 into the reclined position when the steering wheel is in a straight ahead steering angle may therefore increase the space below the steering wheel rim 12, and increase the ease with which the driver can ingress to and egress from the vehicle.

Returning to FIGS. 1, 2a and 2b, the spokes 14 may be coupled, e.g., pivotally coupled, to the hub 4 at a position on the hub 4 such that the steering wheel rim 12, such as the front face 12b of the steering wheel rim, is positioned above, e.g., completely above, the hub 4, when the steering wheel rim 12 is in the reclined position. For example, the spokes 14 may be coupled to the hub 4 at a coupling position that is below an upper extent of the hub 4 by less than the distance, in the direction of the first axis, from the coupling position to the front face 12b of the steering wheel rim 12.

Such arrangements may be advantageous, as an item, such as a note pad, or tablet or laptop computer may be rested flat on the front face 12b of the steering wheel rim 12, without touching the hub 4. Furthermore, pivoting the steering wheel rim assembly 10 about an axis positioned at a higher vertical position may increase a dimension of the space below the steering wheel, in the Z direction, in the reclined position.

Figure 4:
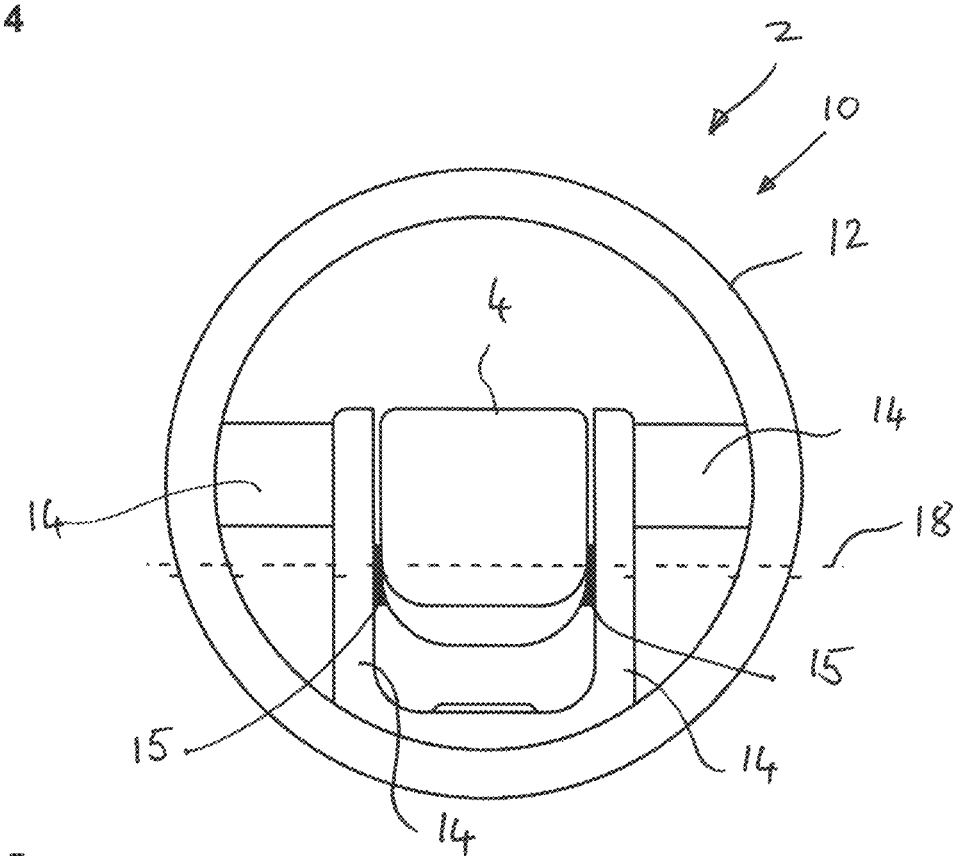
FIG. 4 is a front view of a steering wheel assembly according to another arrangement of the present disclosure.
Figure 5A:
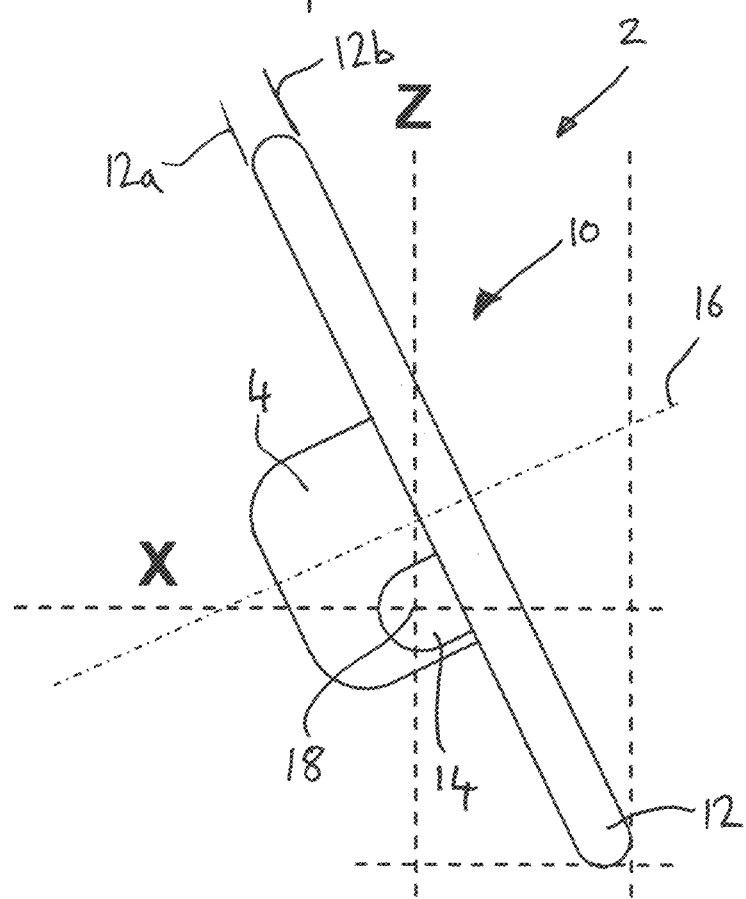
FIGS. 5a and 5b are side views of the steering wheel assembly shown in FIG. 4, in a steering position and in a reclined position, respectively.
Figure 5B:
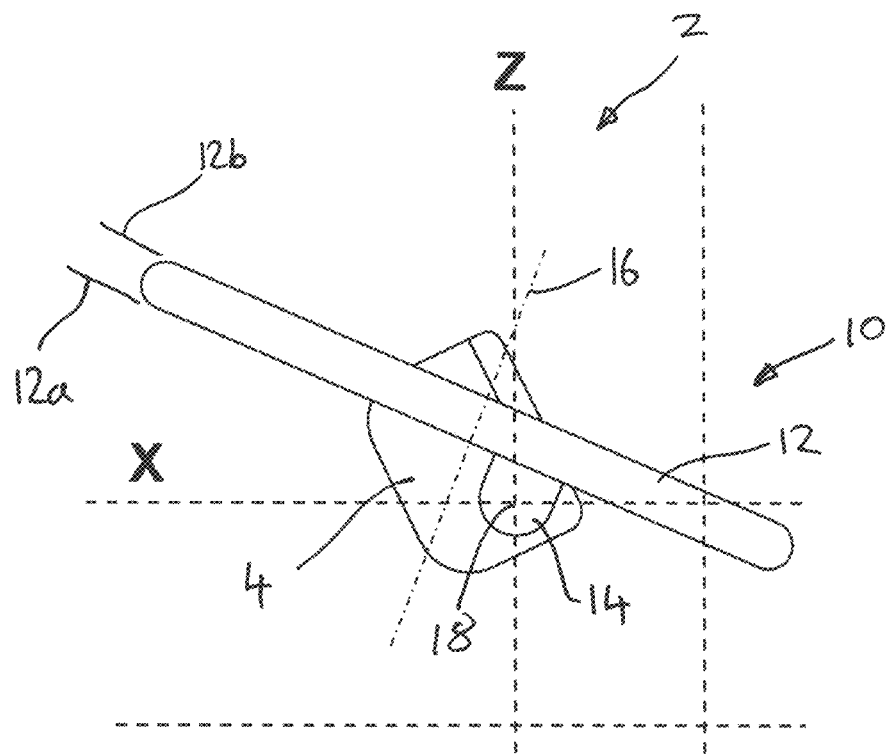

Alternatively, as shown in FIGS. 4, 5a and 5b, the spokes 14 may be coupled to the hub 4 at a lower position on the hub 4. For example, the spokes 14 may be coupled to the hub 4 such that the steering wheel rim 12, such that the front face 12b of the steering wheel rim, is positioned below, e.g., completely below, the upper extent of the hub 4, when the steering wheel rim 12 is in the reclined position. For example, the spokes 14 may be coupled to the hub 4 at a coupling position that is further below the upper extent of the hub 4 than the distance, in the direction of the first axis 16, from the coupling position to the front face 12b of the steering wheel rim 12.

Such arrangements may be advantageous, as coupling the spokes 14 to the hub 4 in the lower position may result in the steering wheel rim 12 protruding less far forwards in the X direction towards the driver, when in the reclined position.

Figure 6:
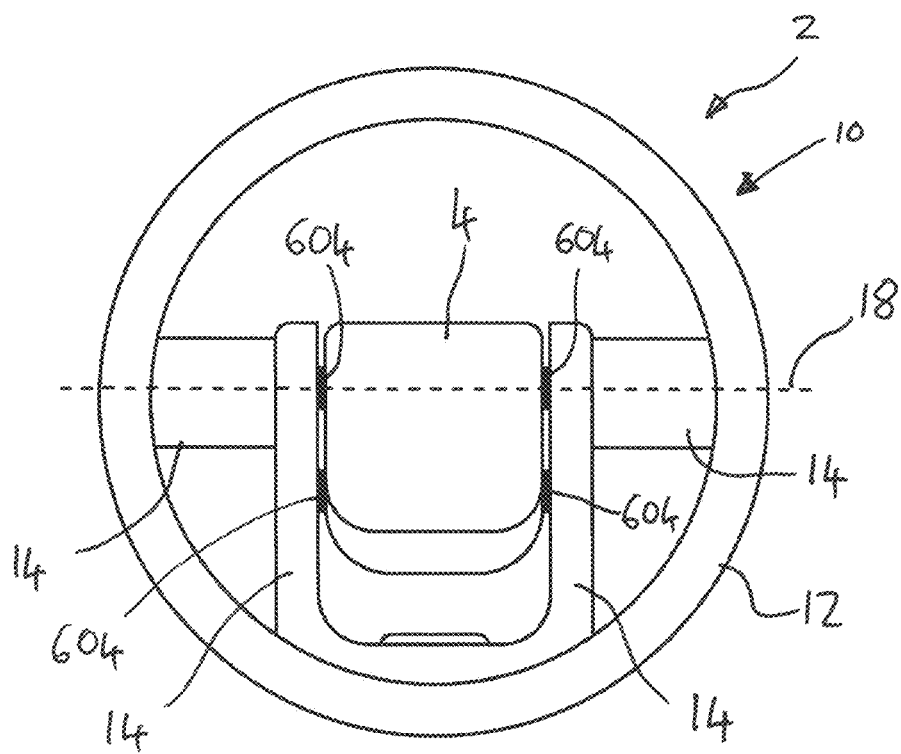
FIG. 6 is a front view of a steering wheel assembly according to another arrangement of the present disclosure.

In the arrangements described above, the steering wheel rim 12 is pivotally coupled to the hub 4. However, as depicted in FIGS. 6, 7a and 7b, the steering wheel rim assembly 10 may be slidably coupled to the steering wheel hub 4.

The hub 4 may comprise one or more slots 602 and the steering wheel rim assembly 10 may comprise one or more pins 604. The pins 604 may be received within respective ones of the slots 602 and may be slidable within the slots 602 such that movement of the steering wheel rim assembly 10 relative to the hub 4 is guided by movement of the pins 604 within the slots 602.

The slots 602 are configured such that sliding of the pins 604 within the slots 602 permits a rotation of the steering wheel rim assembly 10 about the second axis 18. The slots 602 may be configured such that that position of the second axis 18 remains stationary relative to the hub 4 as the pins 604 slide within the respective slots 602. Alternatively, the slots 602 may be configured such that the second axis 18 of rotation of the steering wheel rim moves relative to the hub 4 as the pins 604 slide within the respective slots 602. In other words, the slots 602 may configured such that sliding of the pins 604 within the respective slots 602 results in a translation and a rotation for the steering wheel rim assembly 10 relative to the hub 4. For example, the pins 604 and slots 602 may be configured such that sliding of the pins 604 within the respective slots 602 results in a vertical, e.g., upward, and/or horizontal, e.g., rearward, movement of the steering wheel rim 12 as the steering wheel rim 12 moves from the steering position to the reclined position.

Figure 7A:
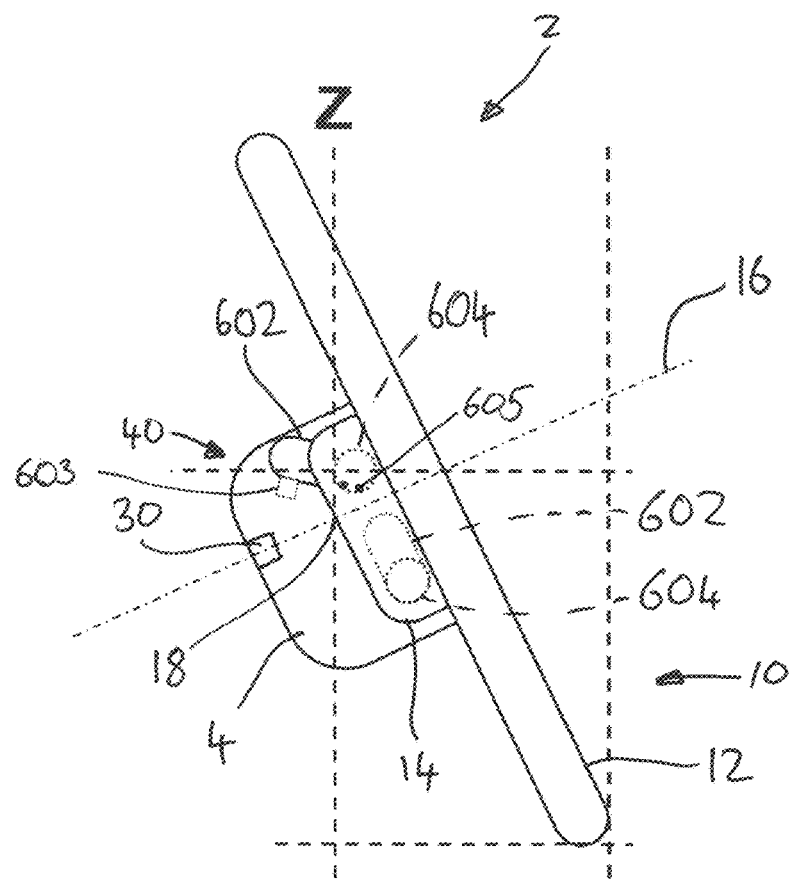
FIGS. 7a and 7b are side views of the steering wheel assembly shown in FIG. 7, in a steering position and in a reclined position, respectively.
Figure 7B:
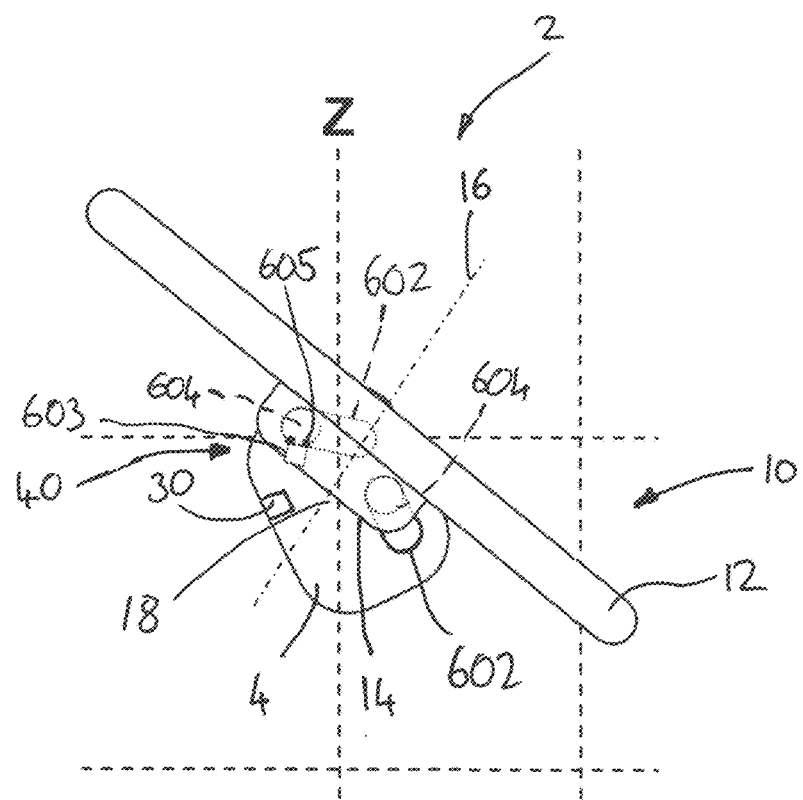

In the arrangement shown in FIGS. 7a and 7b, the slots 602 are formed in the hub 4 and the pins 604 are formed by the steering wheel rim assembly 10, according to one embodiment. However, in other arrangements, the slots 602 may be formed by the steering wheel rim assembly 10 and the pins 604 may be formed on the hub 4, according to other embodiments.

Returning to FIGS. 1, 2a and 2b, the steering wheel assembly 2 may comprise a lock 20 for selectively securing the position of the steering wheel rim 12 and spokes 14 relative to the steering wheel hub 4. The steering wheel assembly 2 may further comprises a release 26 operable, such as by a user, to release the lock 20 so that the steering wheel rim 12 can be moved.

The lock 20 may comprise an electro-mechanical latch comprising an electrically operated actuator 22, and a mechanical latch portion 24, which can be engaged by virtue of the movement the actuator to secure the steering wheel rim 12. In such arrangements, the release 26 comprises a switch configured to control the operation of the actuator 22.

As shown, the lock 20 may be mounted on the steering wheel hub 4. The mechanical latch portion 24 may be configured to engage one or more of the spokes 14 of the steering wheel rim assembly 10 to secure the position of the steering wheel rim 12. Alternatively, the lock 20 may be configured to lock one or more of the rotational couplings 15 to prevent rotation of the steering wheel rim assembly 10 at the rotational couplings 15.

The lock 20 may be configured to secure the position of the steering wheel rim 12 when the steering wheel rim 12 is in the steering position. In some arrangements, the lock 20 may additionally be configured to secure the position of the steering wheel rim 12 in the reclined position and/or in an intermediate position between the steering and reclined positions.

Figure 8A:
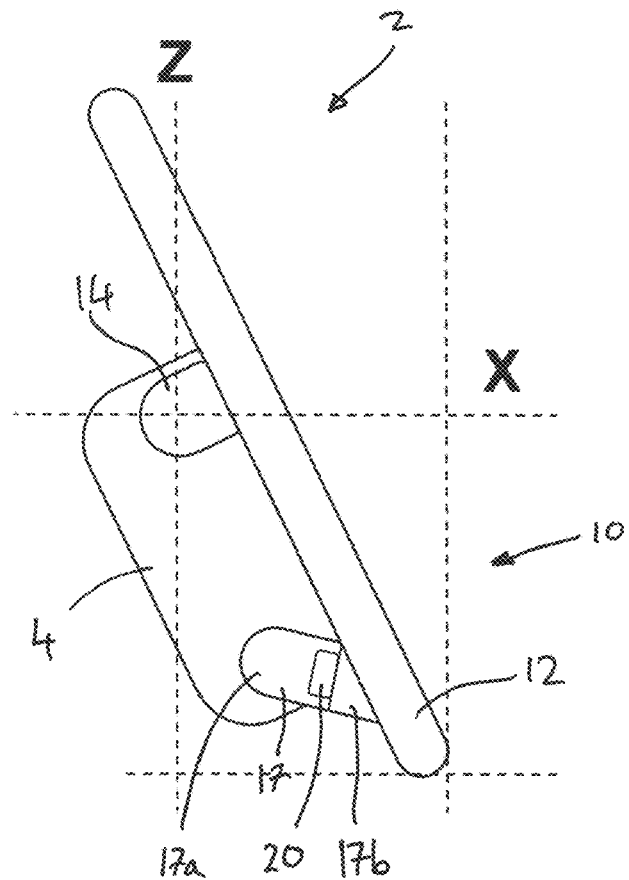
Figure 8A:
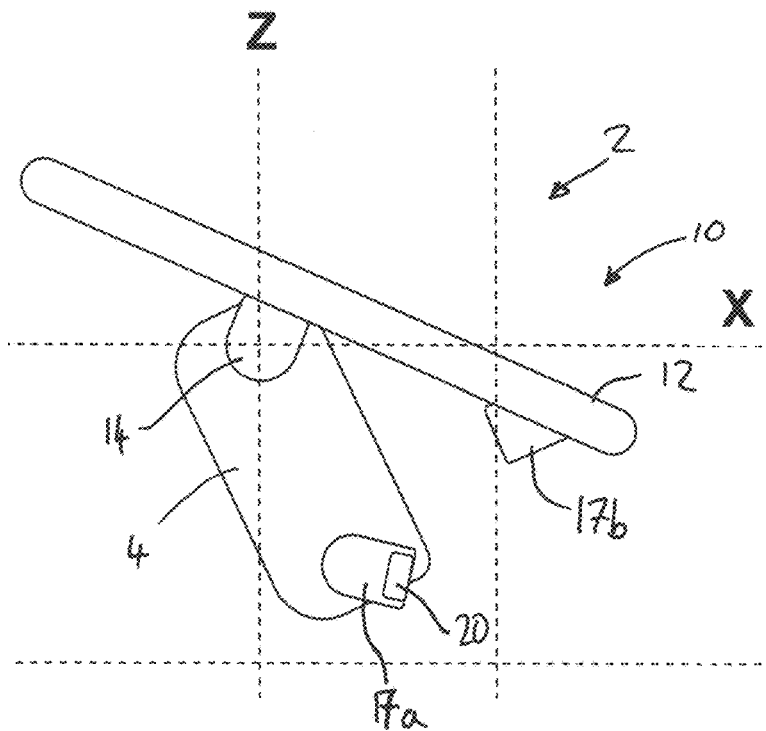

With reference to FIGS. 8a and 8b, in some arrangements the steering wheel assembly 2 may comprise a latch spoke 17 extending from the steering wheel hub 4 to the steering wheel rim 12. As shown, the latch spoke 17 may extend in a direction with a vertical component, when the steering wheel assembly 2 is at a straight ahead steering angle. A first end of the latch spoke 17 may be coupled to the hub 4 and a second end of the latch spoke may be coupled to the steering wheel rim. The latch spoke 17 may therefore act to restrict movement, such as pivoting, of the steering wheel rim 12 relative to the hub 4.

The latch spoke 17 may comprise a first spoke portion 17a, which may be coupled, e.g., fixedly coupled, to the hub 4 and a second spoke portion 17b, which may be coupled, e.g., fixedly coupled, to the steering wheel rim 12. The lock 20 may be configured to couple the first spoke portion 17a to the second spoke portion 17b, when the lock is engaged. Disengaging the lock 20, such as by operating the release 26, may decouple the first spoke portion 17a from the second spoke portion 17b, such that the latch spoke 17 no longer acts to restrict movement of the steering wheel.

In other arrangements, the lock 20 may be configured to couple the latch spoke 17, e.g., the first end of the latch spoke, to the hub 4 or may be configured to couple the latch spoke 17, e.g., the second end of the latch spoke, to the steering wheel rim 12. In such arrangements, the first and second portions 17a, 17b of the latch spoke may be integrally formed or fixedly coupled together.

In other arrangements, the lock 20 and release 26 may operate in any other way to allow the position of the steering wheel rim 12 to be selectively secured relative to the hub 4.

The steering wheel assembly 2 may comprise a steering angle sensor 30, as shown in FIGS. 7a and 7b. The steering angle sensor 30 is configured to determine an angle of rotation of the hub 4 about the steering axis 6. For example, the steering angle sensor 30 may determine the angle of the steering wheel hub 4 compared to a straight ahead steering angle of the steering wheel assembly 2.

The steering wheel assembly 2 may further comprise a rim position sensor 40 configured to determine a position of the steering wheel rim 12. In particular, the rim position sensor 40 may be configured to determine whether the steering wheel rim 12 is in the steering position and/or whether the steering wheel rim 12 is in the reclined position. The rim position sensor 40 may comprise a rotation sensor, such as a rotary potentiometer or a Hall Effect rotation sensor, configured to determine an angle of rotation of the steering wheel rim 12 relative to the hub 4.

Alternatively, as shown in FIGS. 7a and 7b, when the movement of the steering wheel rim 12 is guided by one or more pins 604 sliding within one or more slots 602, the steering wheel assembly may comprise one or more electrical contacts 603 provided on one or more of the slots 602 and one or more corresponding electrical contacts 605 may be provided on one or more of the pins 604 corresponding to the one or more slots 602. The electrical contacts 603 and corresponding electrical contacts 605 may be positioned such that the position of the steering wheel rim 12 relative to the hub 4 can be determined based on the electrical connection formed between the electrical contacts 603 and the corresponding electrical contacts 605. For example, the electrical contacts and corresponding electrical contacts may be configured such that an electrical connection is formed when the steering wheel rim 12 is in the steering position or when the steering wheel rim 12 is in the reclined position.

Alternatively, a plurality of electrical contacts 603 may be provided along the length of the one or more slots 602, so that the position of the steering wheel rim 12 can be determined based on which of the electrical contacts 603 is electrically connected to the corresponding electrical contact 605 formed on the corresponding pin 604.

Figure 9:
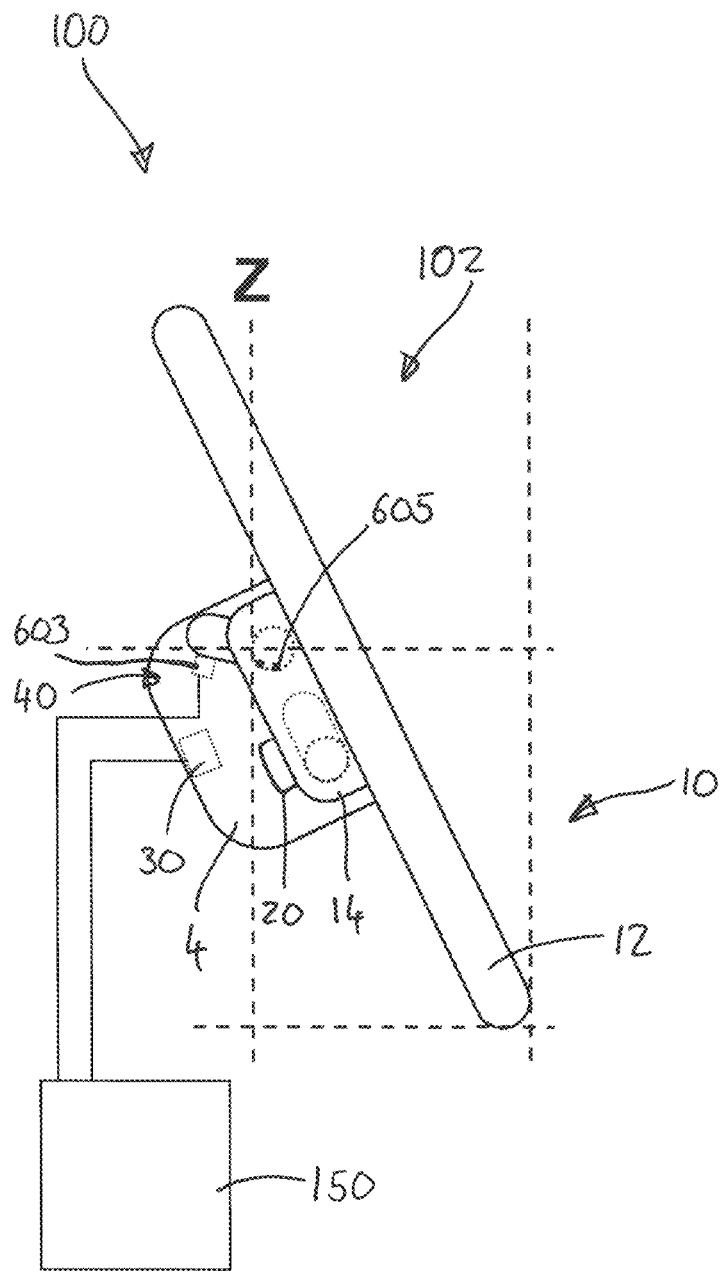
FIG. 9 is a schematic view of an assembly for a motor vehicle comprising a steering wheel assembly.

With reference to FIG. 9, an assembly 100 for a vehicle, such as a motor vehicle, comprises a steering wheel assembly 102, which may be the steering wheel assembly 2 and the features described above with reference to FIGS. 1-8b may apply to the steering wheel assembly 102. Although, in FIG. 9 the steering wheel assembly 102 is depicted having pins 604 and slots 602 for guiding movement of the steering wheel rim 12, in other arrangements the steering wheel assembly 102 may comprise rotational couplings 15 according to other embodiments.

The assembly 100 further comprises a controller 150 for controlling the operation of the steering wheel assembly 2 and, optionally one or more other systems of the motor vehicle based on the operation of the steering wheel assembly 102.

As described above, pivoting the steering wheel rim 12 about the second axis 18 when the steering wheel assembly 102 is in a straight ahead steering angle may increase the space below the steering wheel rim 12, and increase the ease with which the driver can ingress to and egress from the vehicle. However, it will be understood that, when the steering wheel assembly 2 is turned away from the straight ahead steering angle, e.g., through 90 degrees away from the straight ahead position, pivoting the steering wheel rim 12 about the second axis 18 may not increase the space available below the steering wheel rim 12, or may increase the space less than when the steering wheel assembly 2 is at the straight ahead steering angle.

The controller 150 may be configured to receive the steering angle determined by the steering angle sensor 30. The controller 150 may control the lock 20 based on the steering angle. For example, the controller 150 may be configured to operate the lock 20 to permit movement of the steering wheel rim 12 from the steering position to the reclined position, such as when the release 26 is operated by a user, if the steering angle is within a threshold angle of the straight ahead steering angle. The threshold angle may be less than or equal to 15 degrees, according to one example. The assembly 100 via the controller 150, may be configured such that the lock 20 cannot be released when the steering angle is more than the threshold angle from the straight ahead steering angle.

Additionally, it may be undesirable for the steering wheel rim 12 to be moved when the motor vehicle is in an operating condition, such as if a drive system of the vehicle is operating and/or if the vehicle is moving. The vehicle may be considered to be in an operating condition if operating a driving control, such as an accelerator pedal, would accelerate the vehicle.

The controller 150 may be configured to determine whether the vehicle is in an operating condition, such as by referring to one or more sensors or one or more further controllers provided on the vehicle and may control the lock 20 based on whether the vehicle is in an operating condition, For example, the lock 20 may not be released when the release 26 is operated if the vehicle is in an operating condition.

In a similar way, it may be undesirable for the vehicle to be switched into an operating condition when the steering wheel rim 12 is in out of the steering position, such as when the steering wheel rim 12 is in the reclined position. The controller 150 may be configured to deactivate an ignition of the vehicle when the steering when rim is out of the steering position or in the reclined position.

Furthermore, it may be undesirable for a driver restraint system, such as an airbag system, to be active while the steering wheel rim 12 is away from the steering position, e.g., in the reclined position. The controller 150 may be configured to deactivate the driver restraint system of the vehicle when the steering wheel rim 12 is away from the steering position or in the reclined position. The controller 150 may be configured to reactive the ignition system and/or the driver restraint system when the steering wheel rim 12 is moved back to the steering position.

Figure 10A:
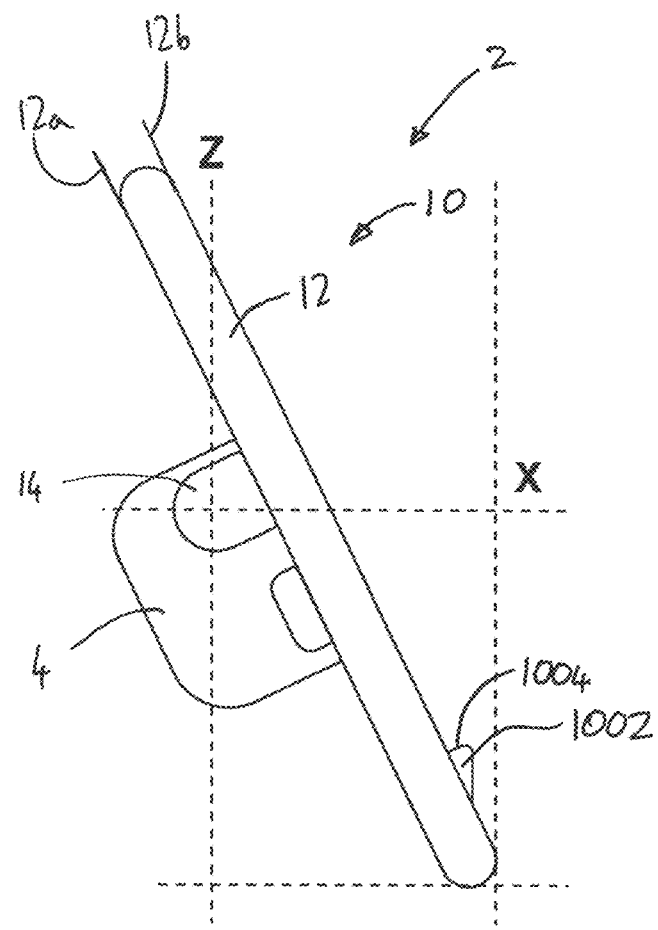
FIGS. 10a and 10b are side views of a steering wheel assembly according to another arrangement of the present disclosure, in a steering position and in a reclined position, respectively.
Figure 10B:
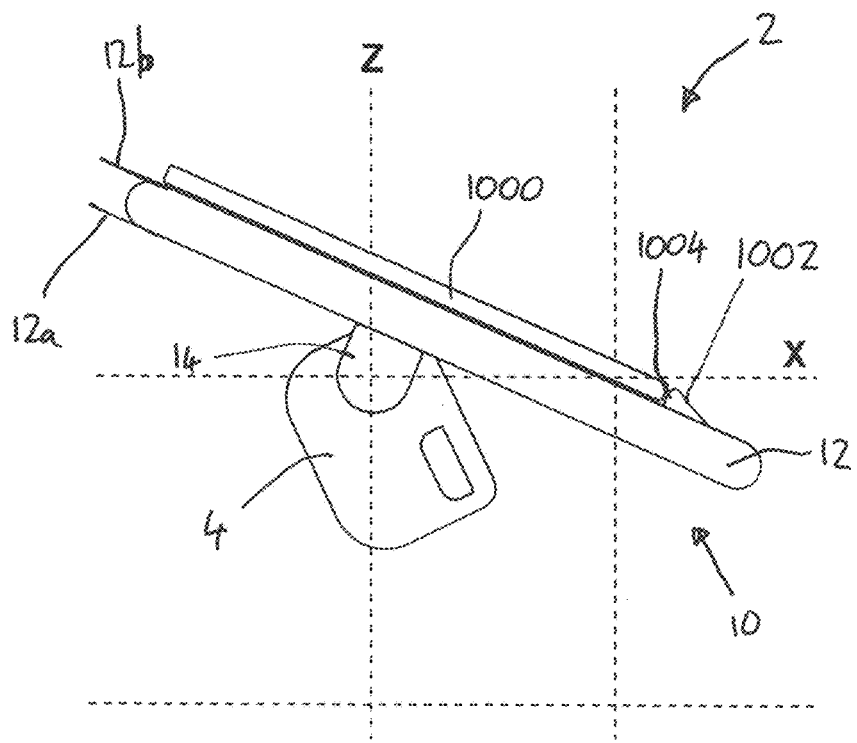

With reference to FIGS. 10a and 10b, in some arrangements, the steering wheel assembly 2 may further comprise a workpiece retainer 1002 for retaining a workpiece 1000, such as a notebook or computer, in position on the steering wheel rim 12, such as when the steering wheel rim is in the reclined position.

As depicted in FIGS. 10a and 10b, the retainer 1002 may comprise a protrusion formed on the steering wheel rim assembly 10, such as on the steering wheel rim 12 and/or on one or more of the spokes 14. As depicted, the retainer 1002 may protrude forwardly, from the front face 12b of the steering wheel rim. The retainer 1002 may comprise an abutment face 1004 that is substantially perpendicular to the front face 12b of the steering wheel rim. The abutment face 1004 is arranged to abut the workpiece 1000 when the workpiece is rested on the front face 12b of the steering wheel rim 12, in order to retain the workpiece 1000 on the steering wheel rim by preventing the workpiece from sliding forwards and/or downwards over the steering wheel rim 12.

In the arrangement depicted in FIGS. 10a and 10b, the retainer 1002 is fixedly coupled to or integrally formed with the steering wheel rim assembly 10. However, with reference to FIGS. 11a and 11b, in other arrangements a workpiece retainer 1102 may be movably, e.g., slidably and/or pivotally, coupled to the steering wheel rim assembly 10, such as to the steering wheel rim 12 and/or spokes 14.

Figure 11A:
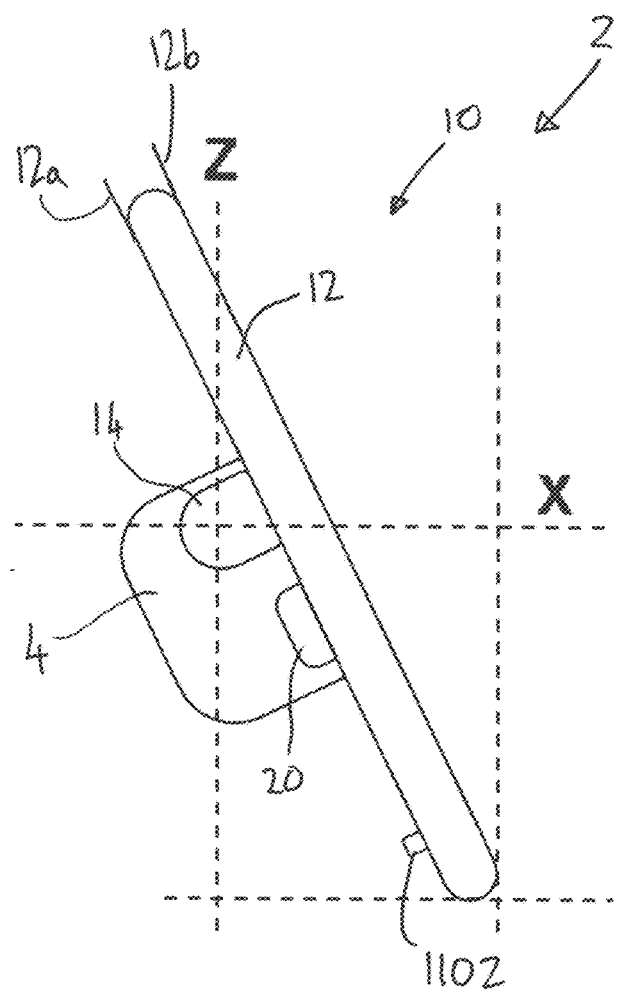
FIGS. 11a and 11b are side views of a steering wheel assembly according to another arrangement of the present disclosure, in a steering position and in a reclined position, respectively.
Figure 11B:
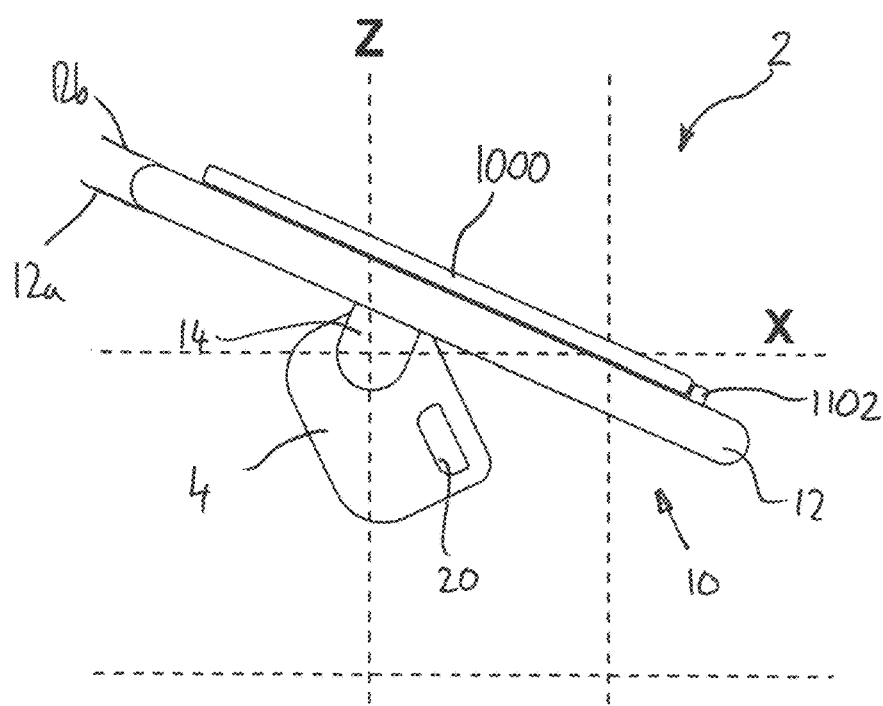

The movable retainer 1102 may be movable between a retracted position, as shown in FIG. 11a, and a protruding position, as shown in FIG. 11b. In the retracted position, the retainer may be arranged rearwards of the front face 12b of the steering wheel rim, and in the protruding position the retainer 1102 may protrude forwardly from the front face of the steering wheel rim 12 in order to retain the workpiece on the steering wheel rim in the same way as the fixed retainer 1002 described above.

As shown in FIG. 11a, when the movable retainer 1102 is in the retracted position, the movable retainer 1102 may protrude rearwardly from the rear face 12a of the steering wheel rim. A user may move the movable retainer 1102 from the retracted position to the protruding position (depicted in FIG. 11b) by pushing on the portion of the movable retainer protruding from the rear face 12a of the steering wheel rim in a forward direction.

Similarly, the user may move the movable retainer 1102 from the protruding position to the retracted position by pushing on the portion of the movable retainer protruding from the front face 12b of the steering wheel rim in a rearward direction.

In some arrangements, the movable retainer 1002 may be biased into the protruding position and the steering wheel assembly 10 may further comprise a retainer latch for retaining the movable workpiece retainer 1102 in the retracted positon. The latch may be configured to engage or release the movable retainer when the movable retainer is moved by the user in a rearwards direction, e.g., pushed or depressed into the steering wheel rim assembly. In other words, the retainer latch may be a push-push operated latch. In such arrangements, the movable retainer 1002 may not protrude from the rear face 12a of the steering wheel rim when in the retracted position and may instead be positioned inside steering wheel rim assembly 10, such as inside the steering wheel rim 12 and/or the spokes 14.

In some arrangements, the movable retainer 1102 may form the release 26 that controls the lock 20 for securing the position of the steering wheel rim 12 relative to the hub 4. For example, when the movable retainer 1102 is in the retracted position, the lock 20 may be engaged and when the movable retainer is in the protruding position, the lock 20 may be released or vice versa.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assembly for a motor vehicle, the assembly comprising:
   a steering wheel assembly comprising:
   a steering wheel hub for coupling to a steering column of the motor vehicle such that rotation of the steering wheel hub about a steering axis rotates the steering column; and
   a steering wheel rim assembly comprising a steering wheel rim extending around a first axis of the steering wheel assembly, wherein the steering wheel rim is movably coupled to the steering wheel hub, such that the steering wheel rim is selectively pivotable relative to the steering wheel hub about a second axis, the second axis having a component in a direction perpendicular to the first axis, wherein the steering wheel rim is pivotable between a steering position, in which the first axis is aligned with the steering axis of the steering wheel hub, and a reclined position, in which the first axis extends in a direction having a greater component in a vertical direction, and wherein the steering wheel rim is biased into the reclined position; and
   a controller configured to determine a pivot angle of the steering wheel rim and activate or deactivate an ignition system and/or a driver restraint system of the vehicle based on the pivot angle.

2. The assembly of claim 1, wherein one of the steering wheel hub and the steering wheel rim assembly comprises one or more slots, and the other of the steering wheel hub and the steering wheel rim assembly comprises one or more pins slidably received within respective ones of the one or more slots, wherein movement of the steering wheel rim relative to the steering wheel hub is guided by the one or more pins moving within one or more of the one or more slots.

3. The assembly of claim 2, wherein the slots and pins are configured such that sliding of the one or more pins within the one or more slots results in a rotation of the steering wheel rim about the second axis and a translation of the steering wheel rim in a direction with a component in a vertical direction.

4. The assembly of claim 2, wherein one of the pins comprises an electrical contact and the slot corresponding to the one of the pins comprises a corresponding electrical contact, wherein a pivot angle of the steering wheel rim is determined based on an electrical connection being made between the electrical contact and the corresponding electrical contact.

5. The assembly of claim 1, wherein the steering wheel rim assembly further comprises one or more rim support members, wherein the steering wheel rim is movably coupled to the steering wheel hub by the one or more rim support members.

6. The assembly of claim 5, wherein:
   the one or more rim support members are fixedly coupled to the steering wheel rim and are movably coupled to the steering wheel hub; or
   the rim support members are fixedly coupled to the steering wheel hub and are movably coupled to the steering wheel rim.

7. The assembly of claim 1, wherein the controller is configured to deactivate the ignition system and/or the driver restraint system when the steering wheel rim is away from the steering position or in the reclined position.

8. The assembly of claim 1 further comprising a lock configured to secure the position of the steering wheel rim relative to the steering wheel hub, and a release for selectively releasing the lock.

9. The assembly of claim 8, wherein the assembly is configured such that the lock is not releasable when the vehicle is in an operating condition.

10. The assembly of claim 8, wherein the assembly further comprises a steering angle sensor configured to determine a rotation angle of the steering wheel hub about the steering axis, wherein the assembly is configured such that the lock is not releasable when the steering angle is more than a threshold angle from a straight ahead steering angle.

11. The assembly of claim 1, wherein the assembly further comprises a workpiece retainer configured to protrude from a front face of the steering wheel rim and abut a workpiece rested on the front face of the steering wheel rim and thereby retain the workpiece on the steering wheel rim.

12. The assembly of claim 11, wherein the workpiece retainer is movably coupled to the steering wheel rim assembly, and wherein the workpiece retainer is movable between a retracted position and a protruding position in which the workpiece retainer protrudes further from the front face of the steering wheel rim.

13. An assembly for a motor vehicle, the assembly comprising:
- a steering wheel assembly comprising:
  - a steering wheel hub for coupling to a steering column of the motor vehicle such that rotation of the steering wheel hub about a steering axis rotates the steering column; and
  - a steering wheel rim assembly comprising a steering wheel rim extending around a first axis of the steering wheel assembly, wherein the steering wheel rim is movably coupled to the steering wheel hub, such that the steering wheel rim is selectively pivotable relative to the steering wheel hub about a second axis, the second axis having a component in a direction perpendicular to the first axis;
- a controller configured to determine a pivot angle of the steering wheel rim and activate or deactivate an ignition system and/or a driver restraint system of the vehicle based on the pivot angle;
- a workpiece retainer configured to protrude from a front face of the steering wheel rim and abut a workpiece rested on the front face of the steering wheel rim and thereby retain the workpiece on the steering wheel rim, and wherein the workpiece retainer is movably coupled to the steering wheel rim assembly, wherein the workpiece retainer is movable between a retracted position and a protruding position in which the workpiece retainer protrudes further from the front face of the steering wheel rim; and
- a lock configured to secure the position of the steering wheel rim relative to the steering wheel hub, and a release for selectively releasing the lock, wherein the workpiece retainer is configured to form the release for releasing the lock, and wherein the steering wheel assembly is configured such that the lock is engaged when the workpiece retainer is in the retracted positon and is disengaged when the workpiece retainer is in the protruding position.

14. A steering wheel assembly for a motor vehicle, the steering wheel assembly comprising:
- a steering wheel hub for coupling to a steering column of the motor vehicle such that rotation of the steering wheel hub about a steering axis rotates the steering column;
- a steering wheel rim assembly comprising a steering wheel rim extending about a first axis of the steering wheel assembly, wherein the steering wheel rim is movably coupled to the steering wheel hub such that the steering wheel rim is selectively pivotable relative to the steering wheel hub about a second axis, the second axis having a component in a direction perpendicular to the first axis, wherein one of the steering wheel hub and the steering wheel rim assembly comprises one or more slots, and the other of the steering wheel hum and the steering wheel rim assembly comprises one or more pins slidably received within respective ones of the one or more slots, wherein movement of the steering wheel rim relative to the steering wheel hub is guided by the one or more pins moving within one or more of the slots; and
- a sensor configured to determine a pivot angle of the steering wheel rim about the second axis.

15. The steering wheel assembly of claim 14 further comprising a controller configured to activate or deactivate an ignition system and/or a driver restraint system of the vehicle based on the pivot angle.

16. The steering wheel assembly of claim 15, wherein the slots and pins are configured such that sliding of the one or more pins within the one of more slots results in a rotation of the steering wheel rim about the second axis and a translation of the steering wheel rim in a direction with a component in a vertical direction.

17. The steering wheel assembly of claim 15, wherein one of the pins comprises an electrical contact and the slot corresponding to the one of the pins comprises a corresponding electrical contact, wherein the pivot angle of the steering wheel rim is determined based on an electrical connection being made between the electrical contact and the corresponding electrical contact.

* * * * *